United States Patent
Larue et al.

(10) Patent No.: US 9,198,118 B2
(45) Date of Patent: Nov. 24, 2015

(54) ROGUE WIRELESS ACCESS POINT DETECTION

(71) Applicant: AT&T Intellectual Property I, L.P., Atlanta, GA (US)

(72) Inventors: Troy Larue, Dublin, OH (US); Joseph Banning, Enfield, CT (US); Ed Sorrell, Sorrento, FL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 181 days.

(21) Appl. No.: 13/708,175

(22) Filed: Dec. 7, 2012

(65) Prior Publication Data

US 2014/0161027 A1 Jun. 12, 2014

(51) Int. Cl.
*H04W 48/16* (2009.01)
*H04W 12/12* (2009.01)
*H04L 29/06* (2006.01)

(52) U.S. Cl.
CPC .............. *H04W 48/16* (2013.01); *H04W 12/12* (2013.01); *H04L 63/10* (2013.01); *H04L 63/107* (2013.01)

(58) Field of Classification Search
None
See application file for complete search history.

(56) References Cited

U.S. PATENT DOCUMENTS

| | | | |
|---|---|---|---|
| 7,336,670 B1 * | 2/2008 | Calhoun et al. | 370/401 |
| 7,370,362 B2 * | 5/2008 | Olson et al. | 726/25 |
| 7,916,705 B2 * | 3/2011 | Olson et al. | 370/338 |
| 7,962,958 B2 * | 6/2011 | Robert et al. | 726/23 |
| 7,965,842 B2 | 6/2011 | Whelan et al. | |
| 8,069,483 B1 * | 11/2011 | Matlock | 726/23 |
| 8,122,243 B1 * | 2/2012 | Farrington et al. | 713/154 |
| 2002/0093527 A1 * | 7/2002 | Sherlock et al. | 345/736 |
| 2004/0003285 A1 * | 1/2004 | Whelan et al. | 713/201 |
| 2004/0103315 A1 * | 5/2004 | Cooper et al. | 713/201 |
| 2004/0111640 A1 * | 6/2004 | Baum | 713/201 |
| 2005/0060576 A1 * | 3/2005 | Kime et al. | 713/201 |
| 2005/0171720 A1 * | 8/2005 | Olson et al. | 702/121 |
| 2005/0254474 A1 * | 11/2005 | Iyer et al. | 370/338 |
| 2006/0114839 A1 * | 6/2006 | Meier et al. | 370/254 |
| 2006/0150250 A1 * | 7/2006 | Lee et al. | 726/23 |
| 2007/0067823 A1 * | 3/2007 | Shim et al. | 726/2 |
| 2007/0076711 A1 * | 4/2007 | Shuster | 370/389 |
| 2007/0097904 A1 * | 5/2007 | Mukherjee et al. | 370/328 |

(Continued)

OTHER PUBLICATIONS

Shetty, Sachin et al., "Rogue Access Point Detection by Analyzing Network Traffic Characteristics", Military Communications Conference 2007, IEEE, Oct. 29-31, 2007, Orlando, Florida, USA, 7 pgs.

(Continued)

*Primary Examiner* — Bunjob Jaroenchonwanit
(74) *Attorney, Agent, or Firm* — Toler Law Group, PC

(57) ABSTRACT

A method includes, receiving a first set of media access control (MAC) addresses from one or more wireless communication detection devices of a network. The method also includes receiving a second set of MAC addresses from one or more wired devices of the network. The second set of MAC addresses corresponds to devices with wired connections to the network. The method further includes, determining that a wireless device having a first MAC address of the first set of media access control addresses is a potential rogue wireless device when a numeric value of the first MAC address and a numeric value of a second MAC address of the second set of MAC addresses differ by no more than a threshold amount and when a first location associated with a device that detects the first MAC address matches a second location associated with the second MAC address.

20 Claims, 4 Drawing Sheets

(56) References Cited

U.S. PATENT DOCUMENTS

| | | |
|---|---|---|
| 2007/0155403 A1* | 7/2007 | Bishop ............... 455/456.1 |
| 2007/0183375 A1* | 8/2007 | Tiwari ............... 370/338 |
| 2007/0288994 A1* | 12/2007 | Tang ............... 726/2 |
| 2008/0049621 A1* | 2/2008 | McGuire et al. ............... 370/236.2 |
| 2008/0052763 A1* | 2/2008 | Hum et al. ............... 726/3 |
| 2008/0151844 A1* | 6/2008 | Tiwari ............... 370/338 |
| 2008/0222352 A1* | 9/2008 | Booth et al. ............... 711/108 |
| 2009/0172151 A1* | 7/2009 | Davis ............... 709/224 |
| 2009/0232311 A1* | 9/2009 | Meier et al. ............... 380/277 |
| 2009/0235354 A1* | 9/2009 | Gray et al. ............... 726/22 |
| 2010/0002702 A1* | 1/2010 | Saito et al. ............... 370/392 |
| 2010/0043066 A1* | 2/2010 | Miliefsky ............... 726/9 |
| 2010/0088747 A1* | 4/2010 | Fink et al. ............... 726/3 |
| 2010/0146272 A1* | 6/2010 | Centonza et al. ............... 713/168 |
| 2011/0191827 A1* | 8/2011 | Balay ............... 726/4 |
| 2011/0222421 A1* | 9/2011 | Jana et al. ............... 370/252 |
| 2011/0231574 A1* | 9/2011 | Saunderson et al. ............... 709/245 |
| 2011/0271345 A1* | 11/2011 | Wolman et al. ............... 726/23 |
| 2011/0314512 A1* | 12/2011 | Sinha et al. ............... 726/1 |
| 2012/0117653 A1* | 5/2012 | Chow et al. ............... 726/24 |
| 2012/0287810 A1* | 11/2012 | Shim et al. ............... 370/252 |
| 2013/0019298 A1* | 1/2013 | Jover Segura et al. ............... 726/7 |
| 2013/0040603 A1* | 2/2013 | Stahlberg et al. ............... 455/410 |
| 2013/0282579 A1* | 10/2013 | Palnitkar et al. ............... 705/44 |
| 2014/0052508 A1* | 2/2014 | Pandey et al. ............... 705/14.4 |
| 2014/0068088 A1* | 3/2014 | Krishnan et al. ............... 709/227 |
| 2014/0139347 A1* | 5/2014 | Forster ............... 340/686.6 |
| 2014/0283029 A1* | 9/2014 | Chandrasekaran et al. ............... 726/22 |

OTHER PUBLICATIONS

Beyah, Raheem et al., "Rogue Access Point Detection Using Temporal Traffic Characteristics", Global Telecommunications Conference 2004, Nov. 29-Dec. 3, 2004, vol. 4, pp. 2271-2275.

* cited by examiner

ROGUE WIRELESS ACCESS POINT DETECTION

FIELD OF THE DISCLOSURE

The present disclosure is generally related to rogue wireless access point detection.

BACKGROUND

A wireless access point connected to a network may provide wireless access to resources within the network. For example, a client device (e.g., a mobile station, a cell phone, a tablet computer, etc.) may access the resources of the network via a wireless connection. If the wireless access point is an authorized wireless access point (e.g., a wireless access point that has received permission from a network administrator of the network to provide network access), the wireless access point may be compliant with a security policy of the network. For example, an authorized wireless access point may include security settings to encrypt information or to access the resources of the network via a particular communication path. However, a rogue wireless access point (e.g., a wireless access point that does not have permission from the network administrator to provide access to the network) may be connected to the network without complying with the security policy.

DETAILED DESCRIPTION

Figure 1:
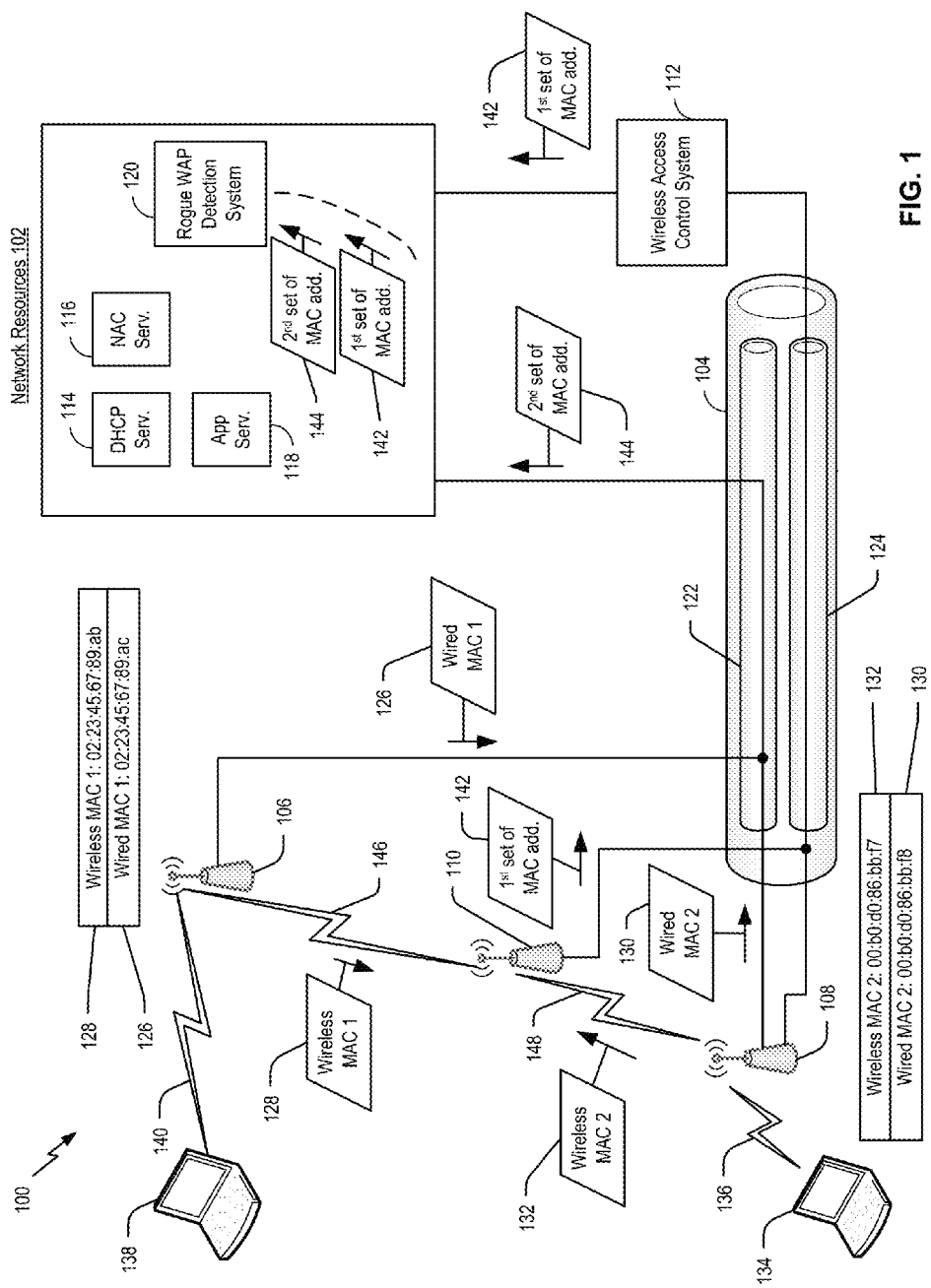
FIG. 1 is a diagram illustrating a particular embodiment of a system that is operable to detect a rogue wireless access point.

A network (e.g., a corporate network) may have connections to wired devices (e.g., wired routers, wired switches, etc.) and to wireless devices (e.g., wireless access points, wireless routers, etc.). Particular ports of the network (e.g., ports on a router, Ethernet connections, etc.) may be designated for use by the wired devices. Other ports of the network may be designated for use by the wireless devices. Differentiation of ports in this manner may enable the network to provide different access control (e.g., security measures) for the wired devices and for the wireless devices to maintain network security. For example, a wired device may be physically connected to a port designated for use with wired devices (e.g., via an Ethernet cable) to transmit data to the network. Thus, the wired device may be at the same physical location as the port in order to reduce the length of the physical wire. Data transmitted between the wired device and the network may be less susceptible to a malicious attack. Additionally, limitations to physical access (e.g., office building security) to the port designated for use by wired devices provides some network security. On the other hand, a wireless device may transmit data to the network via a wireless medium (e.g., an over the air transmission). A connection between the wireless device and the network may be more susceptible to a malicious attack because an attacker may have access to the wireless medium. Therefore, fewer electronic access controls may be used for ports designated for use by wired devices than ports designated for use by wireless devices.

In some instances, a rogue wireless access point (WAP) (e.g., a WAP that is not authorized to connect to the network as a wireless device) may be connected to the network. When the rogue WAP is coupled to a port designated for use by wired devices (e.g., an Ethernet port), the rogue WAP may bypass wireless access control and compromise, or at least reduce, security of the network. For example, an employee of an enterprise may connect a personal WAP to the network (of the enterprise) to start a local wireless network via a particular network port designated for use with wired devices. The employee may connect other wireless devices (e.g., cell phones, tablets, etc.) to the network via the personal WAP. The personal WAP may not have permission from a network administrator of the network to connect to the network to operate as a WAP. Thus, the personal WAP is a rogue WAP. Because the particular network port is designated for use with wired devices, the particular network port may not have the same level of access control as other network ports designated for use with wireless devices. Thus, the security of the network may be compromised, or at least reduced, as an attacker may attack wireless connections between wireless devices and the personal WAP to gain unauthorized access to the network. The systems and methods described herein may enable detection of a rogue WAP that is connected to a network. Detection of a rogue WAP that is connected to a network may enhance security of the network (e.g., by removing the rogue WAP from the network as a part of security measures).

For example, network resources (e.g., an application server and a network access control server, data, etc.) may be connected to a network. A rogue WAP detection system may also be connected to the network. The rogue WAP detection system may receive a wired media access control (MAC) address of each device (e.g., a server, a client device, an access point, etc.) that is connected to the network. The rogue WAP detection system may also receive a list of wireless MAC addresses that are detected in proximity to the network. For example, authorized WAP devices of the network (and possibly other wireless communication detection devices) may be configured to report to the rogue WAP detection system the wireless MAC address of each device that is detected by the authorized WAP devices. The rogue WAP detection system may determine whether a particular WAP device that is detected in proximity to the network is a rogue WAP. For example, the rogue WAP detection system may identify a particular device as a rogue WAP based on a wired MAC address detected on the network, based on a wireless MAC address detected by an authorized WAP devices of the network (and possibly other wireless communication detection devices), and based on a geographic location of the particular device. When the rogue WAP detection system determines that the particular device is a rogue WAP, the rogue WAP detection system may perform security measures (e.g., to remove the rogue WAP from the network, to isolate the rogue WAP from particular resources of the network, etc.) or other actions.

In a particular embodiment, a method includes receiving a first set of media access control (MAC) addresses from one or more wireless communication detection devices of a network. The method also includes receiving a second set of MAC addresses from one or more wired devices of the network. The second set of MAC addresses corresponds to devices with wired connections to the network. The method further includes determining that a wireless device having to a first MAC address of the first set of MAC addresses is a potential rogue wireless device when a numeric value of the first MAC address and a numeric value of a second MAC address of the second set of MAC addresses differ by no more than a threshold amount and when a first location associated with a device that detects the first MAC address matches a second location associated with the second MAC address.

In a particular embodiment, a system includes a processor and a memory accessible to the processor. The memory stores instructions that, when executed by the processor, cause the processor to perform operations including receiving a first set of MAC addresses from one or more wireless communication detection devices of a network. The operations also include receiving a second set of MAC addresses from one or more wired devices of the network. The second set of MAC addresses correspond to devices with wired connections to the network. The operations further include determining that a wireless device having a first MAC address of the first set of MAC addresses is a potential rogue wireless device when a numeric value of the first MAC address and a numeric value of a second MAC address of the second set of MAC addresses differ by no more than a threshold amount and when a first location associated with a device that detects the first MAC address matches a second location associated with the second MAC address.

In a particular embodiment, a computer readable storage device stores instructions that, when executed by a processor, cause the processor to perform operations that include receiving a first set of MAC addresses from one or more wireless communication detection devices of a network. The operations also include receiving a second set of MAC addresses from one or more wired devices of the network. The second set of MAC addresses corresponds to devices with wired connections to the network. The operations further include determining that a wireless device having a first MAC address is a potential rogue wireless device when a numeric value of the first MAC address of the first set of MAC addresses and a numeric value of a second MAC address of the second set of MAC addresses differ by no more than a threshold amount and when a first location associated with a device that detects the first MAC address matches a second location associated with the second MAC address.

By comparing MAC addresses associated with wireless interfaces to MAC addresses associated with wired interfaces, the embodiments disclosed herein enable automated detection of rogue WAPs (or potential rogue WAPs). Additionally, detected rogue WAPs may be controlled by a network administrator (e.g., removed from the network or provided with limited access to network resources).

Referring to FIG. 1, a particular embodiment of a system 100 that is operable to detect a rogue wireless access point is illustrated. The system 100 may include network resources 102, a network 104, a rogue wireless access point (WAP) detection device 110, an authorized WAP 108, and a wireless access control system 112. A rogue WAP 106 is also shown in FIG. 1 to illustrate detection of the rogue WAP 106. The network resources 102, the rogue WAP detection device 110, the authorized WAP 108, the rogue WAP 106, and the wireless access control system 112 may be coupled to the network 104.

For purposes of illustration, the network resources 102 include a dynamic host configuration protocol (DHCP) server 114, a network access control (NAC) server 116, an application server 118. In other embodiments, the network resources 102 include more resources, fewer resources or different resources. The network resources 102 may also include a rogue WAP detection system 120. The DHCP server 114 may assign an internet protocol (IP) address to a client device connected to the network 104. The NAC server 116 may authenticate a client device of the network. The application server 118 may provide a client device with access to software programs remotely. The rogue WAP detection system 120 may include logic to detect rogue WAPs (e.g., the rogue WAP 106) connected to the network 104. The rogue WAP detection system 120 may also perform security measures and take actions to remove a rogue WAP in response to detecting the rogue WAP.

The network 104 may be a local area network (LAN), a wide area network (WAN), a metropolitan area network (MAN), a geographically distributed and access controlled network, or a combination thereof. The network 104 may include wired communication paths 122 and wireless communication paths 124. The wired communication paths 122 may include a logical grouping of connections (e.g., Ethernet connections) to client devices of the network 104. In a particular embodiment, the wired communication paths 122 include a group of network ports connected to a group of wired devices (e.g., wired routers, wired switches). The wireless communication paths 124 may include a logic grouping of connections (e.g., Ethernet connections) of the network 104 that are associated with or are configured to be associated with wireless devices. In a particular embodiment, the wireless communication paths 124 include a group of network ports connected to a group of wireless devices (e.g., WAPs, wireless routers).

The rogue WAP 106 may include a first wired interface (e.g., a network port, a wired device, a device with a wired connection to the wired communication paths 122, etc.) and a first wireless interface (e.g., a radio). The rogue WAP 106 may be connected to the wired communication paths 122 using the first wired interface. The rogue WAP 106 may route data (e.g., data transmitted and/or received via the first wireless interface) to and from the network resources 102 using the wired communication paths 122. A first wired media access control (MAC) address 126 (generally assigned by a manufacturer of the rogue WAP 106) may identify the first wired interface of the rogue WAP 106. A first wireless MAC address 128 (generally assigned by the manufacturer of the rogue WAP 106) may identify the first wireless interface of the rogue WAP 106.

The authorized WAP 108 may include a second wired interface and a second wireless interface. The authorized WAP 108 may be connected to the wired communication paths 122 using the second wired interface and may be connected to the wireless communication paths 124 using the second wireless interface. The authorized WAP 108 may communicate data (e.g., data transmitted and/or received via the second wired interface), to and from the network resources 102 using the wireless communication paths 124. A second wired MAC address 130 may identify the second wired interface of the authorized WAP 108, and a second wireless MAC address 132 may identify the second wireless interface of the authorized WAP 108. Although one authorized WAP (e.g., the authorized WAP 108) is shown in FIG. 1, the system 100 may include multiple authorized WAPs connected to the network 104.

The rogue WAP detection device 110 may include a wired interface and a wireless interface. The rogue WAP detection device 110 may be a wireless communication detection device. In a particular embodiment, the rogue WAP detection device 110 is a wireless access point. The rogue WAP detection device 110 may be a passive wireless communication monitoring device (e.g., a device that listens for wireless communication via a radio but does not transmit data via the radio). The rogue WAP detection device 110 may be connected to the wired communication paths 122 using the wired interface and may be connected to the wireless communication paths 124 using the wireless interface. Although one wireless communication detection device (e.g., the rogue WAP detection device 110) is shown in FIG. 1, the system 100 may include multiple wireless communication detection devices connected to the wired communication paths 122 and/or to the wireless communication paths 124.

The wireless access control system 112 may be connected to the wireless communication paths 124. The wireless access control system 112 may provide access control (e.g., security measures) to data transmitted via the wireless communication paths 124. For example, the wireless access control system 112 may encrypt the data transmitted between a particular wireless client device and the network resources 102. The wireless access control system 112 may also establish a virtual private network between the network resources 102 and a particular wireless client device. Thus, the wired communication paths 122 may be subject to different access controls than the wireless communication paths 124 (e.g., data transmitted between the rogue WAP 106 and the wired communication paths 122 may not be encrypted).

During operation, the authorized WAP 108 may provide a first client device 134 (e.g., a tablet computer, a mobile phone, a laptop computer, etc.) with wireless access to the network resources 102 via a first radio link 136. The first radio link 136 may be associated with the second wireless interface of the authorized WAP 108. The authorized WAP 108 may communicate data between the first client device 134 and the network resources 102 via the wireless communication paths 124. Accordingly, the wireless access control system 112 may perform security measures (e.g., encryption) to the data transmitted between the first client device 134 and the network resources 102. The authorized WAP 108 may receive permission from a network administrator (not shown) of the network 104 to provide wireless access to wireless client devices (e.g., laptop computers, tablet computers, etc.). The authorized WAP 108 may be compliant with a network security policy of the network 104. For example, the network security policy may require the authorized WAP 108 to run a particular version of firmware, to utilize particular user authentication procedures, etc. The network security policy may also include a policy that the authorized WAP 108 is to support a particular data encryption scheme.

The rogue WAP 106 may provide a second client device 138 (e.g., a tablet computer, a mobile phone, a laptop computer, etc.) with wireless access to the network resources 102 via a second radio link 140. The second radio link 140 may be associated with the second wireless interface of the rogue WAP 106. The rogue WAP 106 may communicate data between the second client device 138 and the network resources 102 via the wired communication paths 122. The wireless access control system 112 does not perform security measures to data communicated via the wired communication paths 122. Accordingly, the data between the second client device 138 and the network resources 102 is not subject to network security procedures associated with wireless data. Thus, the data between the second client device 138 and the network resources 102 may be subject to attack. For example, unencrypted data (e.g., packets) transmitted between the second client device 138 and the network resources 102 may be intercepted (e.g., an attacker may use a packet sniffer program to intercept the packets). Additionally, the second client device 138 may not be authorized to access the network resources 102; however, the rogue WAP 106 is not constrained by the network security procedures performed by the wireless access control system 112. Thus, the second client device 138 may have unauthorized access to the network resources 102. Accordingly, the rogue WAP 106 may compromise, or at least reduce, security of the network 104.

The rogue WAP detection system 120 may detect the presence of the rogue WAP 106 based on a first set of MAC addresses 142 (including, for example, the first wireless MAC address 128 and the second wireless MAC address 132) and a second set of MAC addresses 144 (including, for example, the first wired MAC address 126 and the second wired MAC address 130). The first set of MAC addresses 142 may correspond to devices from which a wireless communication is detected by an authorized device of the network 104, such as the authorized WAP 108 or the rogue WAP detection device 110. For example, the rogue WAP detection device 110 may use the wireless interface to detect the first wireless MAC address 128 via a radio link 146 when the rogue WAP detection device 110 is in communication range with the rogue WAP 106. Similarly, the rogue WAP detection device 110 may use the wireless interface to detect the second wireless MAC address 132 via a radio link 148 when the rogue WAP detection device 110 is in communication range with the authorized WAP 108. The rogue WAP detection device 110 may transmit the first set of MAC addresses 142 to the rogue WAP detection system 120.

The second set of MAC addresses 144 may correspond to devices (e.g., the first wired interface of the rogue WAP 106 and the second wired interface of the authorized WAP 108) with wired connections to the network 104. For example, the second set of MAC addresses 144 may be collected by the rogue WAP detection system 120 from devices of the network 104 (such as routing and switching devices (not shown)).

The rogue WAP detection system 120 may compare the first set of MAC addresses 142 and the second set of MAC addresses 144 to an authorized device database (not shown). The authorized device database may include wired MAC addresses and corresponding wireless MAC addresses of each authorized device. For example, the wired MAC addresses and the corresponding wireless MAC addresses of each authorized device may be provided to the authorized device database by a network administrator of the network 104. The rogue WAP detection system 120 may form a filtered first set of MAC addresses by excluding MAC addresses from the first set of MAC addresses 142 that are found in the authorized device database (e.g., excluding information associated with authorized devices). Similarly, the rogue WAP detection system 120 may form a filtered second set of MAC addresses by excluding MAC addresses from the second set of MAC addresses 144 that are found in the authorized device database. The first wireless MAC address 128 may be included in the filter first set of MAC addresses and the first wired MAC address 126 may be included in the filtered second set of MAC addresses because the rogue WAP 106 is not authorized.

After forming the filtered first set of MAC addresses and the filtered second set of MAC addresses, the rogue WAP detection system 120 may compare the filtered first set of MAC addresses to the filtered second set of MAC addresses. For example, the rogue WAP detection system 120 may compare the first wired MAC address 126 to the first wireless MAC address 128. The rogue WAP detection system 120 may determine that a rogue WAP may be present at a location when a numeric value of a wired MAC address detected at the location and a numeric value of the wireless MAC address detected at the location differ by no more than a threshold amount. For example, the first wired MAC address 126 may have a numeric value of 02:23:45:67:89:ab in hexadecimal format, the first wireless MAC address 128 may have a numeric value of 02:23:45:67:89:ac in hexadecimal format, and the threshold amount may be a difference of 4 (e.g., +4 or −4) in decimal format. Thus, the numeric value of the first wired MAC address 126 may differ from the numeric value of the first wireless MAC address 128 by −1 in decimal format as 02:23:45:67:89:ab may be 2350511524267 in decimal format and 02:23:45:67:89:ac may be 2350511524268 in decimal format. In a particular embodiment, the threshold amount is a difference of 4 in hexadecimal format between four least significant bits of the first wired MAC address 126 and four least significant bits of the first wireless MAC address 128.

The rogue WAP detection system 120 may also correlate location information to determine that the rogue WAP 106 may be a potential rogue WAP. The first wired MAC address 126 may have a first associated location. In a particular embodiment, the first associated location corresponds to a location of a particular network port of the wired communication paths 122. In a particular embodiment, the first associated location corresponds to a common location (e.g., a location of an office building) of wired devices connected to the wired communication paths 122. The first wireless MAC address 128 may have a second associated location. In a particular embodiment, the second associated location corresponds to a location of the rogue WAP detection device 110. Since the location of the rogue WAP detection device 110 may be known and the first wireless interface of the rogue WAP 106 is detected by the rogue WAP detection device 110 when the first wireless interface of the rogue WAP detection device 110 is within the receiving range of the rogue WAP detection device 110, the location of the rogue WAP detection device 110 may be used as an estimate of the location of the first wireless interface of the rogue WAP detection device 110.

When the rogue WAP detection system 120 determines that the first associated location of the first wired MAC address 126 matches the second associated location of the first wireless MAC address 128 and that the numeric value of the first wired MAC address 126 and the numeric value of the first wireless MAC address 128 differ by no more than the threshold amount, the rogue WAP detection system 120 may determine that the rogue WAP 106 is a potential rogue WAP.

To enhance the accuracy of the determination that the rogue WAP 106 may be a potential rogue WAP, the rogue WAP detection system 120 may initiate a first action that may solicit a response from the rogue WAP 106 after determining that the rogue WAP 106 is a potential rogue WAP. In a particular embodiment, the first action is sending a message (e.g., a ping message) to the rogue WAP 106. In another particular embodiment, the first action is sending a connection request to the rogue WAP 106. When a response is received from the rogue WAP 106, the rogue WAP detection system 120 may determine that the rogue WAP 106 is an active rogue WAP since the response indicates that the rogue WAP 106 is active. When the response is not received from the rogue WAP 106, the rogue WAP detection system 120 may maintain the determination that the rogue WAP 106 is a potential rogue WAP.

An active WAP may pose a more serious potential compromise to security of the network 104 than a potential rogue WAP. An active WAP may be powered on and actively communicating data between a client device and the network resources 102, while a potential rogue WAP may be powered off. Thus, when there is at least one potential rogue WAP and at least one active rogue WAP, the rogue WAP detection system 120 may assign a higher priority to the active rogue WAP than the potential rogue WAP for subsequent remedial action.

In response to determining that the rogue WAP 106 is a potential rogue WAP and/or the rogue WAP 106 is an active rogue WAP, the rogue WAP detection system 120 may initiate a second action to remediate potential security concerns associated with the rogue WAP 106. In a particular embodiment, the second action includes dispatching a technician to investigate the rogue WAP 106 (e.g., to confirm presence of the rogue WAP 106, to remove the rogue WAP 106, etc.). In another particular embodiment, the second action includes sending a message (e.g., an instant message) to the second client device 138 via the wired communication paths 122 to request a user of the second client device 138 to remove the rogue WAP 106 from the network 104. In another particular embodiment, the second action includes causing one or more routing devices (e.g., wired routers) of the network 104 to perform MAC address blocking to block the first wireless MAC address 128. Thus, the system 100 may detect a potential rogue WAP (e.g., the rogue WAP 106) and perform remedial actions be taken against the potential rogue WAP.

Figure 2:
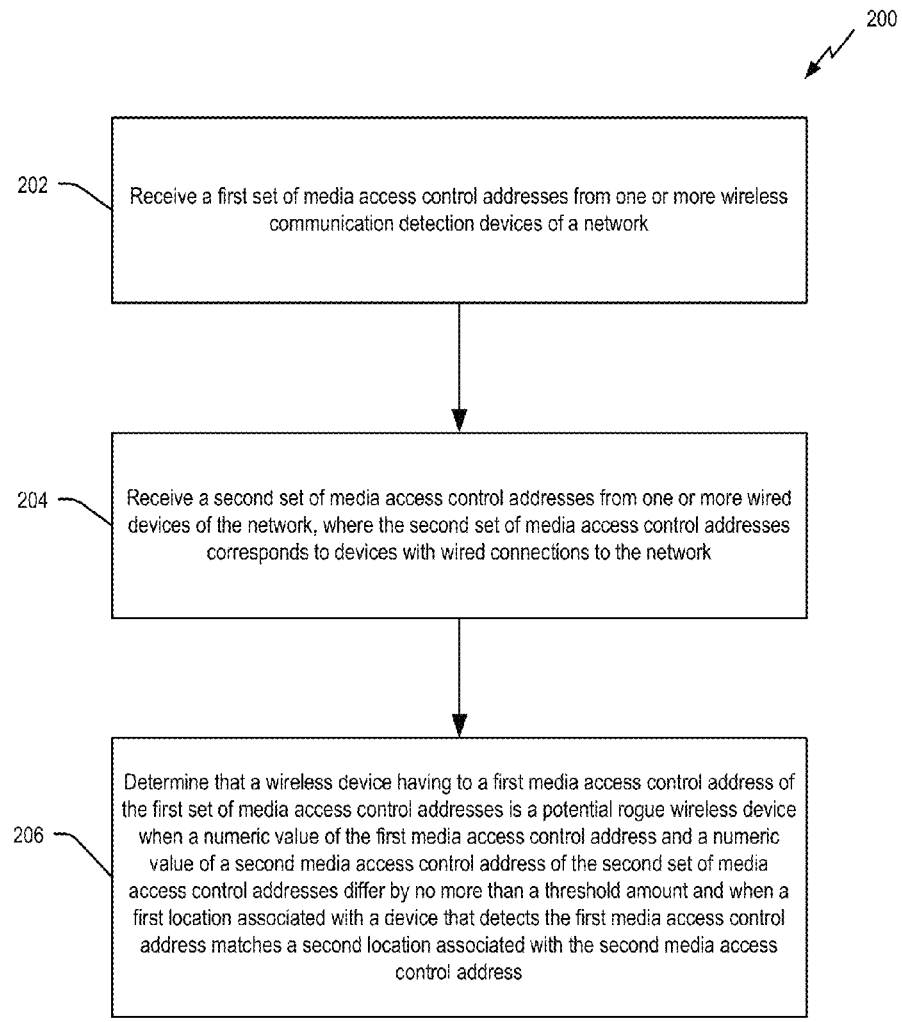
FIG. 2 is a flowchart illustrating a first particular embodiment of a method of operation at the system of FIG. 1.

Referring to FIG. 2, a first particular embodiment of a method 200 of operation at the system 100 of FIG. 1 is illustrated. The method 200 includes receiving a first set of media access control addresses from one or more wireless communication detection devices of a network, at 202. The first set of media access control addresses corresponds to devices detected by at least one wireless communication detection device of the one of more of the wireless communication detection devices. For example, referring to FIG. 1, the rogue WAP detection system 120 may receive the first set of MAC addresses 142 from the rogue WAP detection device 110, the authorized WAP 108, or both. The first set of MAC addresses 142 may include the first wireless MAC address 128 and the second wireless MAC address 132. To illustrate, the rogue WAP detection device 110 may detect the rogue WAP 106 via the radio link 146.

The method 200 also includes receiving a second set of media access control addresses from one or more wired devices of the network, at 204. The second set of media access control addresses corresponds to devices with wired connections to the network. For example, referring to FIG. 1, the rogue WAP detection system 120 may receive the first wired MAC address 126 and the second wired MAC address 130 as the second set of MAC addresses 144. The rogue WAP detection system 120 may receive the first wired MAC address 126 from the devices of the network 104 (e.g., routers and switches).

The method 200 further includes determining that a wireless device having a first media access control address of the first set of media access control addresses is a potential rogue wireless device when a numeric value of the first media access control address and a numeric value of a second media access control address of the second set of media access control addresses differ by no more than a threshold amount and when a first location associated with a device that detects the first media access control address matches a second location associated with the second media access control address, at 206. For example, referring to FIG. 1, the rogue WAP detection system 120 may determine that the rogue WAP 106 is a potential rogue WAP when the rogue WAP detection system 120 determines that the numeric value of the first wired MAC address 126 and the numeric value of the first wireless MAC address 128 differ by no more than the threshold amount and that the first associated location of the first wired MAC address 126 corresponds to the second associated location of the first wireless MAC address 128.

Figure 3:
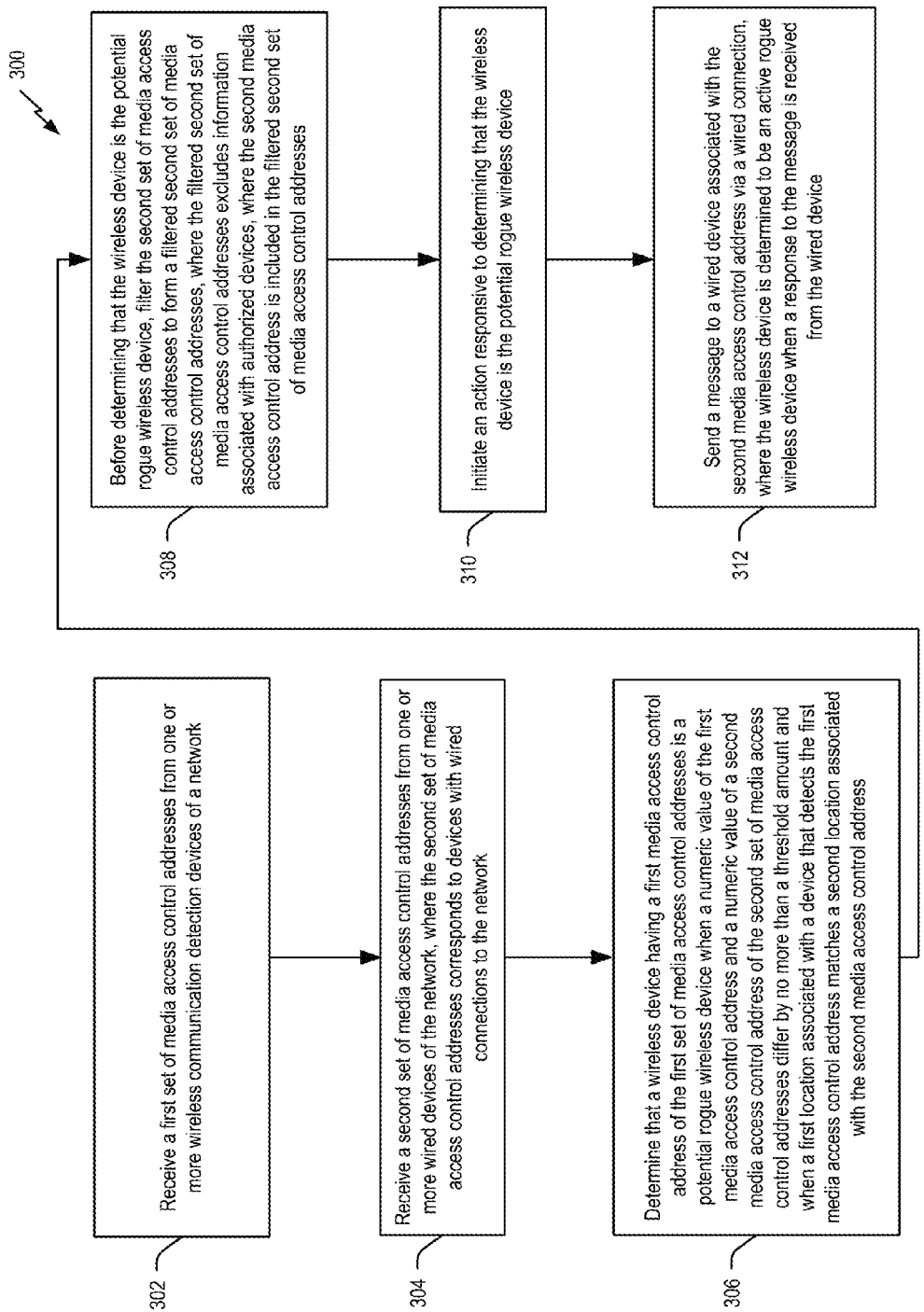
FIG. 3 is a flowchart illustrating a second particular embodiment of a method of operation at the system of FIG. 1.

Referring to FIG. 3, a second particular embodiment of a method 300 of operation at the system 100 of FIG. 1 is illustrated. The method 300 includes receiving a first set of media access control addresses from one or more wireless communication detection devices of a network, at 302. The first set of media access control addresses corresponds to devices detected by at least one wireless communication detection device of the one of more of the wireless communication detection devices. For example, referring to FIG. 1, the rogue WAP detection system 120 may receive the first set of MAC addresses 142 from the rogue WAP detection device 110, the authorized WAP 108, or both. The first set of MAC addresses 142 may include the first wireless MAC address 128 and the second wireless MAC address 132.

The method 300 also includes receiving a second set of media access control addresses from one or more wired devices of the network, at 304. The second set of media access control addresses corresponds to devices with wired connections to the network. For example, referring to FIG. 1, the rogue WAP detection system 120 may receive the first wired MAC address 126 and the second wired MAC address 130 as the second set of MAC addresses 144. The rogue WAP detection system 120 may receive the second set of MAC addresses 144 from devices of the network 104 (e.g., routers and switches (not shown)).

The method 300 further includes determining that a wireless device having a first media access control address of the first set of media access control addresses is a potential rogue wireless device when a numeric value of the first media access control address and a numeric value of a second media access control address of the second set of media access control addresses differ by no more than a threshold amount and when a first location associated with a device that detects the first media access control address matches a second location associated with the second media access control address, at 306. For example, referring to FIG. 1, the rogue WAP detection system 120 may determine that the rogue WAP 106 is a potential rogue WAP when the rogue WAP detection system 120 determines that the numeric value of the first wired MAC address 126 and the numeric value of the first wireless MAC address 128 differ by no more than the threshold amount and that the first associated location of the first wired MAC address 126 corresponds to the second associated location of the first wireless MAC address 128.

In a particular embodiment, the method 300 further includes, before determining that the wireless device is the potential rogue wireless device, filter the second set of media access control addresses to form a filtered second set of media access control addresses, at 308. In this embodiment, the filtered second set of media access control addresses may be used to identify potential rogue WAP devices. For example, the filtered second set of media access control addresses may exclude information associated with authorized devices. Since the potential rogue WAPs are not authorized, the second media access control address may be included in the filtered second set of media access control addresses when the second media access control address is associated with a device that is not authorized to be present on the network. For example, referring to FIG. 1, the rogue WAP detection system 120 may form a filtered second set of MAC addresses by excluding MAC addresses from the second set of MAC addresses 144 that are found in the authorized device database. The first wired MAC address 126 may be included in the filtered second set of MAC addresses since the rogue WAP 106 is not an authorized device of the network 104.

In a particular embodiment, the method 300 further includes initiating an action responsive to determining that the wireless device is the potential rogue wireless device, at 310. For example, referring to FIG. 1, in response to determining that the rogue WAP 106 is a potential rogue WAP, the rogue WAP detection system 120 may initiate the second action to remediate the potential security concerns caused by the rogue WAP 106.

In a particular embodiment, the method 300 further includes, after determining that the wireless device is the potential rogue wireless device, sending a message to a wired device associated with the second media access control address via a wired connection, at 312. The wireless device may be determined to be an active rogue wireless device when a response to the message is received from the wired device. For example, referring to FIG. 1, the rogue WAP detection system 120 may initiate the first action that may solicit a response from the rogue WAP 106 after determining that the rogue WAP 106 may be the potential rogue WAP.

Figure 4:
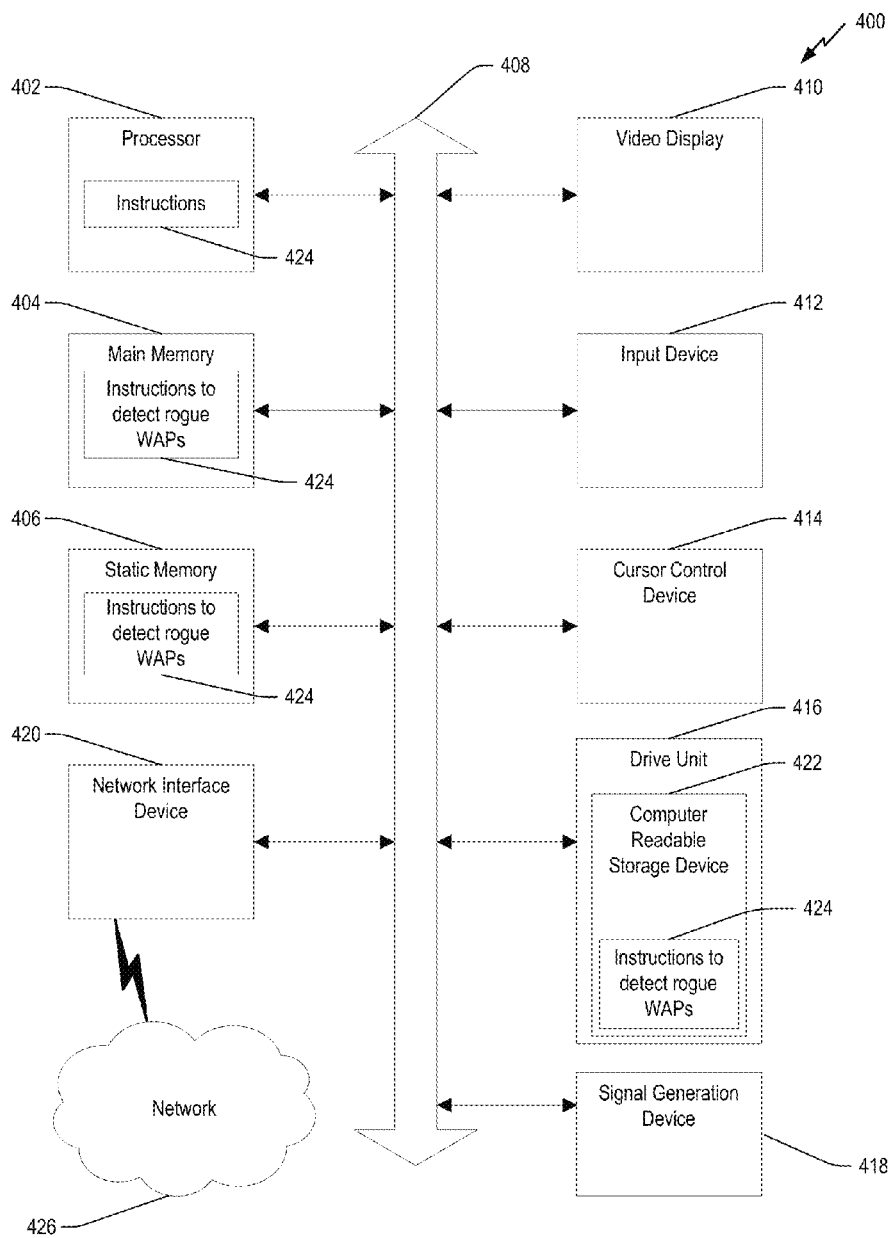
FIG. 4 is a block diagram of an illustrative embodiment of a general computer system including components that are operable to detect a rogue wireless access point.

Referring to FIG. 4, an illustrative embodiment of a general computer system 400 is shown. The general computer system 400 may include a set of instructions that can be executed to cause the general computer system 400 to perform any one or more of the methods or computer based functions disclosed herein. The general computer system 400 may operate as a standalone device or may be connected, e.g., using a network, to other computer systems or peripheral devices. For example, the general computer system 400 may include, be included within, or correspond to one or more of the components of the system 100, the rogue WAP detection system 120 of FIG. 1, or a combination thereof described with reference to FIG. 1.

In a networked deployment, the general computer system 400 may operate in the capacity of a server or as a client user computer in a server-client user network environment, or as a peer computer system in a peer-to-peer (or distributed) network environment. The general computer system 400 may also be implemented as or incorporated into various devices, such as a personal computer (PC), a tablet PC, a STB, a personal digital assistant (PDA), a customer premises equipment device, an endpoint device, a mobile device, a palmtop computer, a laptop computer, a desktop computer, a communications device, a wireless telephone, a web appliance, or any other machine capable of executing a set of instructions (sequential or otherwise) that specify actions to be taken by that machine. In a particular embodiment, the general computer system 400 may be implemented using electronic devices that provide video, audio, or data communication. Further, while one general computer system 400 is illustrated, the term "system" shall also be taken to include any collection of systems or sub-systems that individually or jointly execute a set, or multiple sets, of instructions to perform one or more computer functions.

As illustrated in FIG. 4, the general computer system 400 may include a processor 402, e.g., a central processing unit (CPU), a graphics processing unit (GPU), or both. The processor 402 may be one or more components (e.g., a processor) of the rogue WAP detection system 120 of FIG. 1, one or more components operable to detect a rogue WAP, or a combination thereof. Moreover, the general computer system 400 may include a main memory 404 and a static memory 406, which can communicate with each other via a bus 408. For example, the main memory 404 may be one or more components (e.g., a memory) of the rogue WAP detection system 120 of FIG. 1, one or more components operable to store data, or a combination thereof. As shown, the general computer system 400 may further include a video display unit 410, such as a liquid crystal display (LCD), a flat panel display, a solid state display, or a lamp assembly of a projection system. Additionally, the general computer system 400 may include an input device 412, such as a keyboard, and a cursor control device 414, such as a mouse. The general computer system 400 may also include a drive unit 416, a signal generation device 418, such as a speaker or remote control, and a network interface device 420. Some general computer systems 400 may not include an input device (e.g., a server may not include an input device).

In a particular embodiment, as depicted in FIG. 4, the drive unit 416 may include a computer-readable storage device 422 in which one or more sets of instructions 424, e.g. software, can be embedded. The computer-readable storage device 422 may be a non-transitory computer-readable storage device. Further, the instructions 424 may embody one or more of the methods or logic as described herein. The instructions 424 may be executable by the processor 402 to perform one or more functions or methods described herein, such as the methods described with reference to FIGS. 2 and 3. In a particular embodiment, the instructions 424 may reside completely, or at least partially, within the main memory 404, the static memory 406, and/or within the processor 402 during execution by the general computer system 400. The main memory 404 and the processor 402 also may include computer-readable non-transitory storage media.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionality as described herein.

The present disclosure contemplates a tangible computer-readable storage device 422 that stores the instructions 424 or receives, stores, and executes the instructions 424, so that a device connected to a network 426 may communicate voice, video or data over the network 426. For example, the tangible computer-readable storage device 422 device may include or be included within one or more of the components of the rogue WAP detection system 120, one or more devices operable to detect rogue WAPs, or a combination thereof described with reference to FIG. 1. While the tangible computer-readable storage device 422 is shown to be a single device, the tangible computer-readable storage device 422 may include a single medium or multiple media, such as a centralized or distributed database, and/or associated caches and servers that store one or more sets of instructions. The tangible computer-readable storage device 422 may include any tangible medium that is capable of storing a set of instructions for execution by a processor or that cause a computer system to perform any one or more of the methods or operations disclosed herein.

In a particular non-limiting, exemplary embodiment, the tangible computer-readable storage device 422 may include a solid-state memory such as a memory card or other package that houses one or more non-volatile read-only memories. Further, the tangible computer-readable storage device 422 may be a random access memory or other volatile re-writable memory. Additionally, the tangible computer-readable storage device 422 may include a magneto-optical or optical medium, such as a disk or tapes or other storage device. Accordingly, the disclosure is considered to include any one or more of a tangible computer-readable storage device and other equivalents and successor media, in which data or instructions may be stored.

Although the present specification describes components and functions that may be implemented in particular embodiments with reference to particular standards and protocols, the disclosed embodiments are not limited to such standards and protocols. Such standards and protocols are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
    receiving, at a detection system, a first set of wireless media access control addresses for wireless access points of a network from an authorized network device of the network;
    receiving, at the detection system, a second set of wired media access control addresses for wired connections to the network; and
    determining, with the detection system, whether a wireless access point is a potential rogue wireless device, wherein the wireless access point has a first wireless media access control address of the first set of wireless media access control addresses, and wherein determining whether the wireless access point is the potential rogue wireless device includes:
        determining whether a difference between a numeric value of the first wireless media access control address and a numeric value of a second wired media access control address of the second set of wired media access control addresses satisfies a threshold amount; and
        determining whether a first location associated with the first wireless media access control address corresponds to a second location associated with the second wired media access control address, wherein the wireless access point is determined to be the potential rogue wireless device when the difference satisfies the threshold amount and the first location corresponds to the second location, and wherein the potential rogue wireless device is associated with the first wireless media access control address and the second wired media access control address.

2. The method of claim 1, further comprising, before determining whether the wireless access point is the potential rogue wireless device, filtering the second set of wired media access control addresses to form a filtered second set of wired media access control addresses, wherein the filtered second set of wired media access control addresses excludes information associated with authorized devices, and wherein the second media access control address is included in the filtered second set of wired media access control addresses.

3. The method of claim 1, further comprising initiating an action responsive to determining that the wireless access point is the potential rogue wireless device.

4. The method of claim 3, wherein the action includes dispatching a technician to investigate the wireless access point.

5. The method of claim 3, wherein the action includes sending a message to a user of the wireless access point via a wired connection.

6. The method of claim 3, wherein the action includes causing a wired routing device of the network to perform media access control address blocking associated with the second media access control address.

7. The method of claim 1, further comprising:
    in response to a determination that the wireless access point is the potential rogue wireless device, sending a message to a wired device associated with the second wired media access control address via a wired connection; and
    identifying the wireless access point as an active rogue wireless device in response to the message received from the wired device.

8. The method of claim 7, wherein the message includes a ping message, a connection request, or both.

9. The method of claim 1, wherein the wireless access point is the potential rogue wireless device when the difference satisfies the threshold amount and the first location corresponds to the second location, and wherein the potential rogue wireless device is associated with the first wireless media access control address and the second wired media access control address.

10. The method of claim 1, wherein the difference satisfies the threshold amount when the difference is no more than the threshold amount.

11. The method of claim 1, wherein the authorized network device includes a second wireless access point, a passive wireless communication monitoring device, or both.

12. The method of claim 1, wherein the network comprises a geographically distributed, access controlled network including an authorized wireless access point and including a wired connection that is subject to different access controls than the authorized wireless access point.

13. A system comprising
    a processor; and
    a memory accessible to the processor, the memory storing instructions that, when executed by the processor, cause the processor to perform operations comprising:
        receiving a first set of wireless media access control addresses for wireless access points of a network;
        receiving a second set of wired media access control addresses for devices with wired connections to the network; and
        determining whether a wireless access point is a potential rogue wireless device, wherein the wireless access point has a first wireless media access control address of the first set of wireless media access control addresses, and wherein determining whether the wireless access point is the potential rogue wireless device includes:
            determining whether a difference between a numeric value of the first wireless media access control address and a numeric value of a second wired media access control address of the second set of wired media access control addresses satisfies a threshold amount; and
            determining whether a first location associated with the first wireless media access control address corresponds to a second location associated with the second wired media access control address, wherein the wireless access point is determined to be the potential rogue wireless device when the difference satisfies the threshold amount and the first location corresponds to the second location, and wherein the potential rogue wireless device is associated with the first wireless media access control address and the second wired media access control address.

14. The system of claim 13, wherein the operations further comprise, before determining that the wireless access point is the potential rogue wireless device, adding the second wired media access control address to a filtered second set of wired media access control addresses that excludes information associated with authorized devices.

15. The system of claim 14, wherein the operations further comprise initiating an action responsive to determining that the wireless access point is the potential rogue wireless device, wherein the action includes causing a wired routing device of the network to perform media access control address blocking associated with the second media access control address.

16. The system of claim 14, wherein the operations further comprise receiving the information associated with the authorized devices from an authorized device database.

17. The system of claim 13, wherein the operations further comprise, after determining that the wireless access point is the potential rogue wireless device, sending a message to a wired device associated with the second media access control address via a wired connection, wherein the wireless access point is determined to be an active rogue wireless device when a response to the message is received from the wired device.

18. The system of claim 17, wherein the wired device is a router, a switch, or both.

19. The system of claim 13, further comprising a network interface, wherein the operations further comprise determining the first location based on the network interface being in operable range of the wireless access point.

20. A computer readable storage device storing instructions that, when executed by a processor, cause the processor to perform operations comprising:
receiving a first set of wireless media access control addresses for wireless access points of a network;
receiving a second set of wired media access control addresses for wired connections to the network; and
determining whether a wireless access point is a potential rogue wireless device, wherein the wireless access point has a first wireless media access control address of the first set of wireless media access control addresses, and wherein determining whether the wireless access point is the potential rogue wireless device includes:
determining whether a difference between a numeric value of the first wireless media access control address and a numeric value of a second wired media access control address of the second set of wired media access control addresses satisfies a threshold amount; and
determining whether a first location associated with the first wireless media access control address corresponds to a second location associated with the second wired media access control address, the wireless access point is determined to be the potential rogue wireless device when the difference satisfies the threshold amount and the first location corresponds to the second location, and wherein the potential rogue wireless device is associated with the first wireless media access control address and the second wired media access control address.

* * * * *